United States Patent
Sane et al.

(10) Patent No.: US 10,216,186 B2
(45) Date of Patent: Feb. 26, 2019

(54) TASK ALLOCATION AND VARIABLE AUTONOMY LEVELS

(71) Applicant: Sikorsky Aircraft Corporation, Stratford, CT (US)

(72) Inventors: Harshad S. Sane, Southbury, CT (US); Suraj Unnikrishnan, Sandy Hook, CT (US); Igor Cherepinsky, Sandy Hook, CT (US); Suresh Kannan, Burlington, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/443,823

(22) Filed: Feb. 27, 2017

(65) Prior Publication Data
US 2017/0336789 A1    Nov. 23, 2017

Related U.S. Application Data

(60) Provisional application No. 62/340,343, filed on May 23, 2016.

(51) Int. Cl.
*G05D 1/00*   (2006.01)
*B64C 13/16*   (2006.01)
(Continued)

(52) U.S. Cl.
CPC ........... *G05D 1/0061* (2013.01); *B64C 13/04* (2013.01); *B64C 13/16* (2013.01); *G06Q 10/0631* (2013.01); *G06Q 10/06311* (2013.01)

(58) Field of Classification Search
CPC .................................................. G05D 1/0061
See application file for complete search history.

(56) References Cited

U.S. PATENT DOCUMENTS

| | | | |
|---|---|---|---|
| 6,675,076 B1 * | 1/2004 | Moody | G05D 1/0061 |
| | | | 244/221 |
| 8,751,068 B2 * | 6/2014 | Barraci | G06Q 50/30 |
| | | | 701/3 |

(Continued)

FOREIGN PATENT DOCUMENTS

| | | |
|---|---|---|
| EP | 2437033 A2 | 4/2012 |
| EP | 2521087 A1 | 11/2012 |

OTHER PUBLICATIONS

Keinrath et al., "Designing for the future: A Cognitive-Adaptive-Man-Machine-Interface," 2010, Iowa State University.*

(Continued)

*Primary Examiner* — Thomas G Black
*Assistant Examiner* — Sara J Lewandroski
(74) *Attorney, Agent, or Firm* — Cantor Colburn LLP

(57) ABSTRACT

A system and method for flying an aircraft is disclosed. The system includes one or more flight-assist agents for performing an operation related to flying the aircraft and a vehicle autonomy management system. The vehicle autonomy management system allocates tasks of a task workload involved in the operation between a flight crew and the one or more flight-assist agents, monitors a performance of the flight crew in executing a portion of the task workload allocated to the flight crew, and adjusts an allocation of the task workload between the flight crew and the one or more flight-assist agents based on the performance of the flight crew.

11 Claims, 7 Drawing Sheets

(51) Int. Cl.
*B64C 13/04* (2006.01)
*G06Q 10/06* (2012.01)

(56) References Cited

U.S. PATENT DOCUMENTS

| | | | |
|---|---|---|---|
| 8,892,274 B2 | 11/2014 | Baudry | |
| 9,440,747 B1* | 9/2016 | Welsh | B64D 43/02 |
| 2005/0216138 A1* | 9/2005 | Turung | B64D 45/0015 |
| | | | 701/3 |
| 2007/0029449 A1* | 2/2007 | Matos | G05D 1/0061 |
| | | | 244/195 |
| 2007/0050101 A1* | 3/2007 | Sacle | B64D 45/0015 |
| | | | 701/11 |
| 2008/0154439 A1* | 6/2008 | Mira | B64D 45/0015 |
| | | | 701/2 |
| 2009/0112456 A1* | 4/2009 | Halaas | G05D 1/0061 |
| | | | 701/532 |
| 2010/0174426 A1* | 7/2010 | Turung | G05D 1/0061 |
| | | | 701/11 |
| 2010/0305785 A1* | 12/2010 | Faurie | G05D 1/0061 |
| | | | 701/9 |
| 2012/0075123 A1* | 3/2012 | Keinrath | G01C 23/00 |
| | | | 340/963 |
| 2012/0078445 A1 | 3/2012 | Krupansky et al. | |
| 2012/0116610 A1* | 5/2012 | Righi | B64D 45/0015 |
| | | | 701/3 |
| 2012/0215384 A1* | 8/2012 | Fritz | G05D 1/0061 |
| | | | 701/2 |
| 2012/0277933 A1* | 11/2012 | Krogh | G05D 1/0061 |
| | | | 701/11 |
| 2013/0124076 A1* | 5/2013 | Bruni | G08G 5/0095 |
| | | | 701/120 |
| 2013/0325216 A1* | 12/2013 | Rieunier | B64C 19/00 |
| | | | 701/3 |
| 2014/0204115 A1* | 7/2014 | Rogers | G05B 13/0265 |
| | | | 345/619 |
| 2014/0343765 A1* | 11/2014 | Suiter | G08G 5/0056 |
| | | | 701/18 |
| 2015/0197329 A1* | 7/2015 | Fong | B64C 13/18 |
| | | | 701/11 |
| 2016/0217697 A1* | 7/2016 | Huber | G05D 1/0061 |
| 2016/0247406 A1* | 8/2016 | Khatwa | G05D 1/0061 |
| 2016/0260335 A1* | 9/2016 | Chenna | G08G 5/0013 |
| 2017/0008613 A1* | 1/2017 | Turpin | G05D 1/0061 |
| 2018/0061246 A1* | 3/2018 | Adler | G08G 5/0039 |

OTHER PUBLICATIONS

EP Communication; Extended European Search Report; Application No. 17160819.3-1871; dated Jul. 31, 2017; pp. 1-7.

* cited by examiner

TASK ALLOCATION AND VARIABLE AUTONOMY LEVELS

CROSS-REFERENCE TO RELATED APPLICATIONS

This US non-provisional application claims priority to the U.S. provisional application Ser. No. 62/340,343, which was filed on May 23, 2016, the contents of which are incorporated herein by reference.

STATEMENT OF FEDERAL SUPPORT

This invention was made with government support with the United States Government under DARPA Contract No.: HR0011-15-9-0004. The government therefore has certain rights in this invention.

BACKGROUND OF THE INVENTION

The present invention is directed to a system and method for flying an aircraft and, in particular, to dynamically allocating flight and aircraft systems management tasks between a flight crew and an autonomous vehicle autonomy management system based, in part, on flight crew performance.

Pilots of modern rotary aircraft have many flight duties, including flying, navigation, communications, etc. Due to the growing complexity of rotary aircraft, the number of duties and the level of concentration consequently required by the pilot can be demanding. Especially during contingent situations, such as during poor weather conditions or when a threat appears to the aircraft, the workload or concentration level of the pilot can be taxed to a point that the pilot makes otherwise avoidable flight errors that may otherwise result in reduced efficiency of flight. At least for such situations, there is a need for a flight system that can aid the pilot in flying the aircraft by taking on certain flight tasks from the pilot.

SUMMARY OF THE INVENTION

According to one embodiment of the present invention, a method of flying an aircraft is provided, the method including: allocating a task workload for an operation related to flying the aircraft between a flight crew and one or more flight-assist agents; monitoring a workload and performance of the flight crew in executing a portion of the task workload allocated to the flight crew; and adjusting an allocation of the task workload between the flight crew and the one or more flight-assist agents based on the performance of the flight crew and a selected autonomy level.

According to another embodiment of the present invention, a system for flying an aircraft is provided, the system including: one or more flight-assist agents for performing an operation related to flying the aircraft; a vehicle autonomy management system configured to: allocate tasks of a task workload involved in the operation between a flight crew and the one or more flight-assist agents, monitor a performance of the flight crew in executing a portion of the task workload allocated to the flight crew, and adjust an allocation of the task workload between the flight crew and the one or more flight-assist agents based on the performance of the flight crew.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

In accordance with an embodiment of the present invention, a vehicle autonomy management system runs as part of an autonomous system for flying an aircraft. The vehicle autonomy management system has knowledge encoded for changes in mission task decomposition during normal flight conditions as well as for contingent modes of operation, such as under threatening situations or inclement weather conditions. The vehicle autonomy management system can have an awareness of threats, risks, weather conditions, etc., and can also capture sensor inputs and inputs from the flight crew, which can include one or more crew members, in order to determine which actions are to be assigned, allocated or distributed to the flight crew. The captured information can be used to interpret an intention of a flight crew during mission contingencies such as the flight crew's attempts to evade threats, etc. The vehicle autonomy management system can set a level of autonomy for the flight crew during flight operations to maintain flight crew workload within acceptable limits for continued mission success. In doing so, the vehicle autonomy management system determines whether the flight crew is able to make required changes or inputs for completion of an ongoing assigned flight task in a timely manner. The vehicle autonomy management system estimates flight crew workload based on the number of inputs and/or input corrections needed, flight crew input delays and/or error, and a frequency of flight crew inputs as well using baseline internal workload models. The vehicle autonomy management system can then allocate or re-allocate tasks between the flight crew and one or more flight-assist agents based on an awareness of the current flight situation as well as on the ability of the flight crew to respond to the current flight situation. This framework is suitable for situations where the flight crew is unable to respond in a timely manner to all required actions warranted by a change in flight scenario. Autonomous systems can operate with a reduced number of members of the flight crew and dynamic allocation can maintain mission feasibility and success when a crew is incapacitated.

Figure 1:
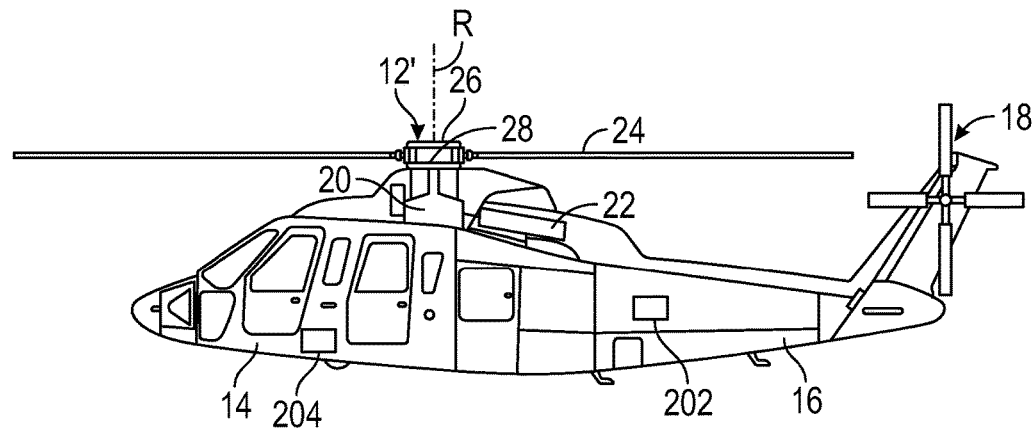
FIG. 1 schematically illustrates a rotary wing aircraft having a main rotor assembly.

Referring now to the Figures, where the invention will be described with reference to specific embodiments, without limiting same, FIG. 1 schematically illustrates a rotary wing aircraft 10 having a main rotor assembly 12. The aircraft 10 includes an airframe 14 having an extending tail 16 which mounts a tail rotor assembly 18, such as an anti-torque system, a translational thrust system, a pusher propeller, a rotor propulsion system, and the like. The main rotor assembly 12 is driven about an axis of rotation R through a gearbox (illustrated schematically at 20) by one or more engines 22. The main rotor assembly 12 includes multiple rotor blades 24 mounted to a rotor hub 26, and a swashplate 28 that is used to affect a state or orientation of the rotor blades 24. Although a particular helicopter configuration is illustrated herein and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention. Flight control surfaces can include servos, individual blade control actuators, on-blade flaps and/or slats, tail rotors, propellers, etc. Actuators of various types can be used in different embodiments of the aircraft. Some actuators may include: rockets, magneto/plasma thrusters, momentum-reaction wheels, control moment gyroscopes, nutation dampers, solar radiation pressure actuators, rotary pulse generators, and magnetic torquers. In addition to rotary wing aircraft, the vehicle autonomy management system disclosed herein can be used in fixed wing aircraft and other transportation vehicles.

The aircraft 10 includes situational awareness sensors 202 for determining a flight condition of the aircraft 10. The situational awareness sensors 202 can include sensors that monitor changes in weather patterns or conditions, such as humidity, temperature, the approach of storm fronts or turbulent regions, for example. The situational awareness sensors 202 can also include sensors that detect approaching objects or incoming threats to the aircraft 10.

The aircraft 10 also includes flight crew workload performance sensors 204 for measuring various data with respect to a pilot's or flight crew's performance related to assigned or allocated flight tasks. In various embodiments, the performance sensors 204 include cameras that track and observe pilot/flight crew actions, biometric sensors that measure pilot's or crew member's vital statistics, eye and voice tracking systems that measure pilot or crew member attention status, and electrical sensors that detect electrical signals generated by pilot/flight crew input, such as a movement of a control device, flipping of a switch, movement of a lever, etc. The cameras and electrical sensors can be used to observe or monitor a pilot's or flight crew's actions.

Figure 2:
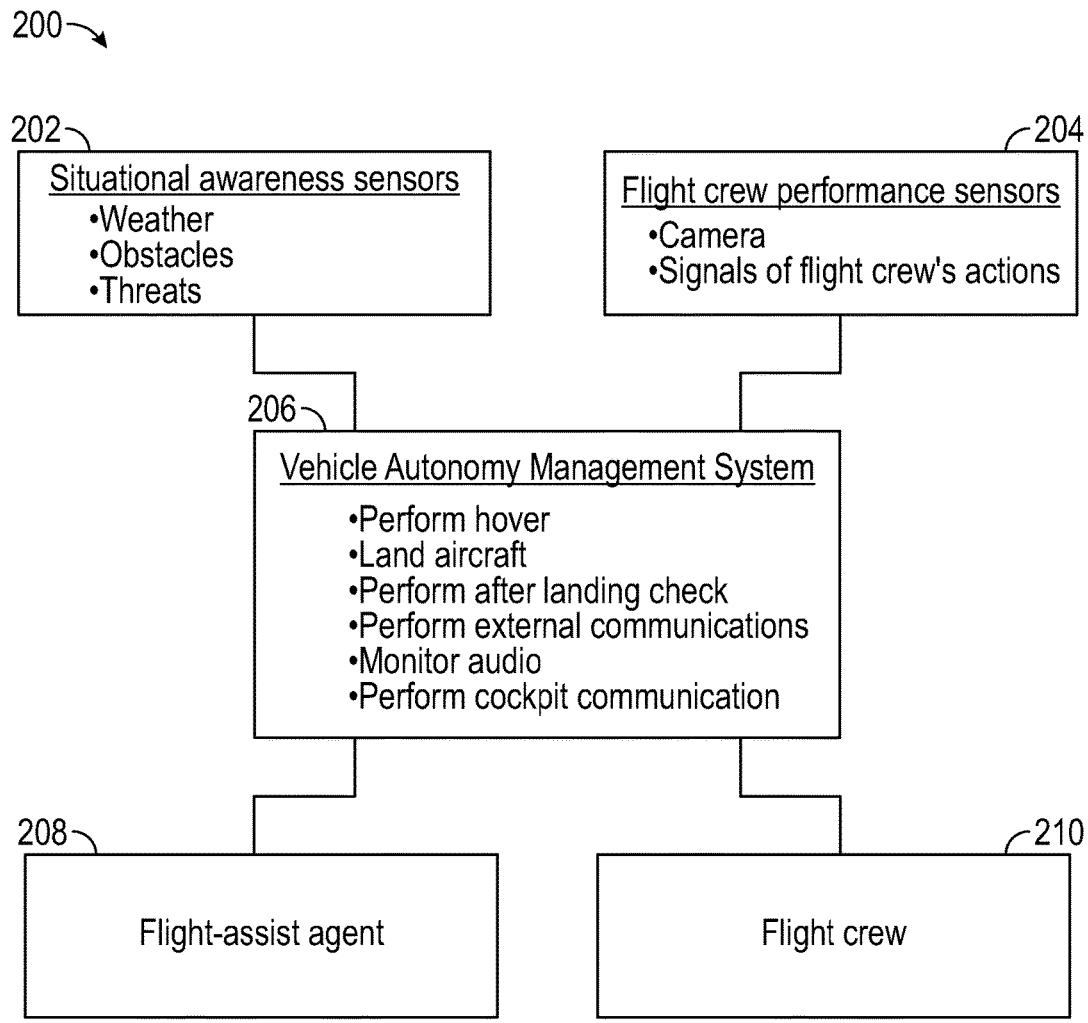
FIG. 2 shows an autonomous system for management of aircraft systems of FIG. 1 in accordance with one embodiment of the present invention.

FIG. 2 shows an autonomous system 200 for flying the aircraft 10 in accordance with one embodiment of the present invention. The autonomous system 200 includes a flight-assist agent 208 that can fly the aircraft and a vehicle autonomy management system 206 that allocates tasks between the flight-assist agent 208 and a flight crew 210. The flight-assist agent 208 may represent one or more flight-assist agents, in various embodiments. The flight crew 210 can refer to a pilot or another crew member or the flight crew as a group. In one embodiment, the flight-assist agent 208 flies the aircraft without any input from the flight crew 210. In another embodiment, the flight-assist agent 208 performs some flight tasks while the flight crew 210 performs other flight tasks. The flight-assist agent 208 includes systems that actuate various flight systems, stabilize aircraft along a certain command or trajectory, and operate various aircraft systems that may be needed to execute a task autonomously. The vehicle autonomy management system 206 decides which tasks are assigned to the flight crew 210 and which tasks are assigned to the flight-assist agent 208 based on a selected level of autonomy and associated workload models. Input from at least the situational awareness sensors 202 and performance sensors 204 are provided to the vehicle autonomy management system 206 in order to monitor or observe the flight crew's performance vis-à-vis flight situations and therefore to determine how to allocate tasks.

The vehicle autonomy management system 206 also tracks a mission goal of the flight as well as various operations that go into completing the mission goal. FIG. 2 shows an illustrative listing of operations that go into performing a mission goal, including (A) Perform hover, (B) Land Aircraft, (C) Perform after landing check, (D) Perform external communication, (E) Monitor audio, (F) Perform cockpit communications. These operations may be performed in any order and not necessarily in the order shown in FIG. 2. Other operations not shown here may also be performed by the vehicle autonomy management system 206 in other embodiments of the invention. The vehicle autonomy management system 206 receives data from situational awareness sensors 202 and performance sensors 204 in order to determine that the tasks necessary for completing a flight operation are being performed. The vehicle autonomy management system 206 also executes an algorithm in order to determine how to allocate the operations between the flight-assist agent 208 and the flight crew 210. The vehicle autonomy management system 206 can determine the allocation of tasks based on a situational awareness of the flight conditions as well as a level of performance of the flight crew 210.

Figure 3:
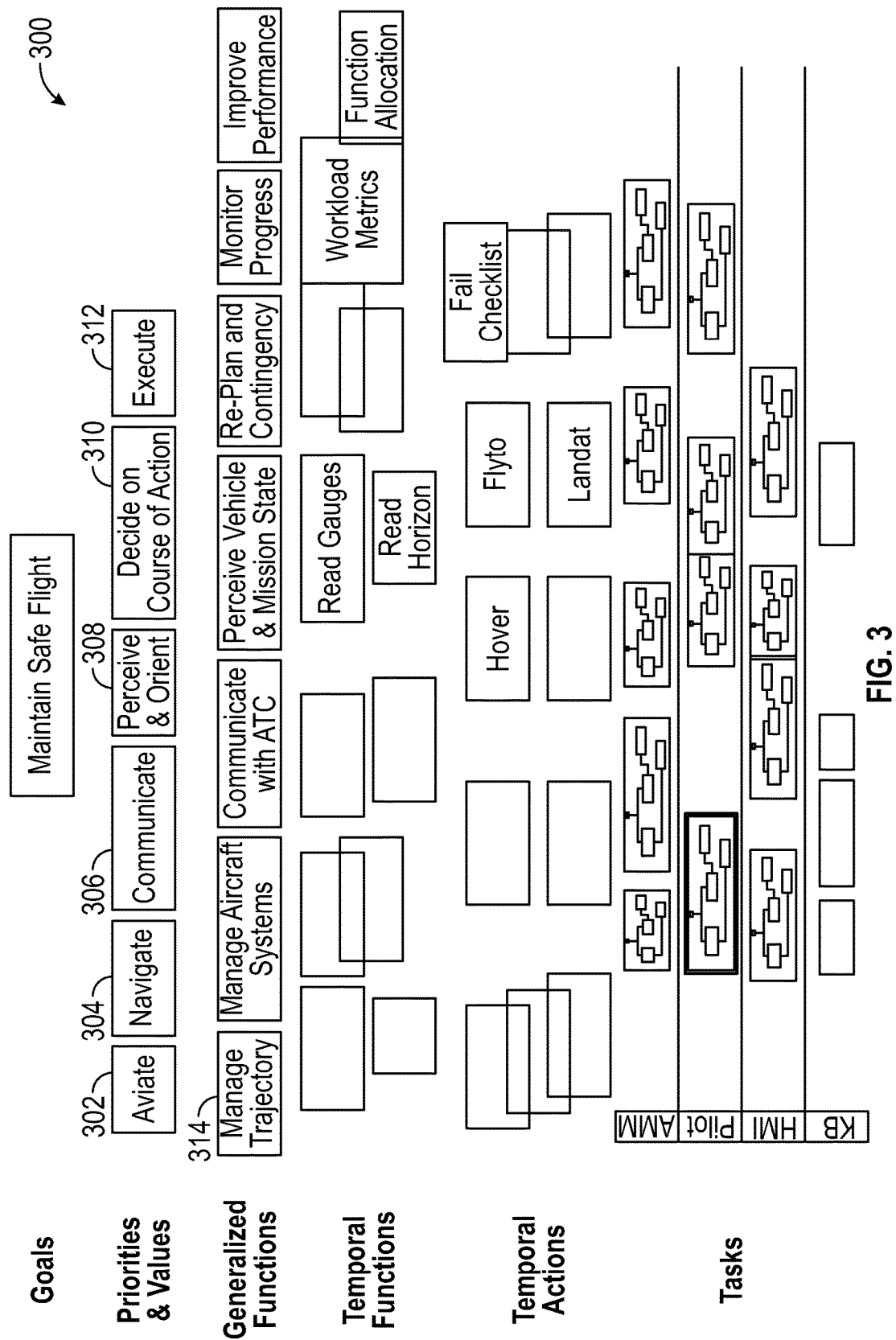
FIG. 3 shows a hierarchical display for a library of functions employed in maintaining a safe flight for the aircraft.

FIG. 3 shows a hierarchical display 300 for a library of functions employed in maintaining a safe flight for an aircraft. As an example, the overall flight goal ("Maintain safe flight") is stated on a top row of the hierarchy. Various priorities and values that go into achieving the goal of maintaining of the safe flight are shown in the second row from the top of the hierarchy. Exemplary priorities and values include aviation 302, navigation 304, communications 306, perception and orientation 308, deciding on a course of action 310 and execution of the flight plan 312. The third row from the top includes a generalized list of functions that are performed in order to complete the priorities in the second row. The generalized list of functions can be used in any combination with respect to the priorities listed on the second row. For example, aviation 302 and navigation 304 priorities can both use the function of managing trajectory 314 from the third row. The generalized functions of the third row are further decomposed into temporal functions in the fourth row, and the temporal functions are further decomposed into temporal actions in the fifth row. Each temporal action of the fifth row can be decomposed into a task workload or a number of tasks that are to be performed in order to complete the temporal action. These tasks can be allocated between the flight-assist agent 208 and the flight crew 210 as decided by the vehicle autonomy management system 206. The vehicle autonomy management system 206 includes a library of missions and associated mission decompositions to accomplish them in nominal as well as contingent situations.

Figure 4:
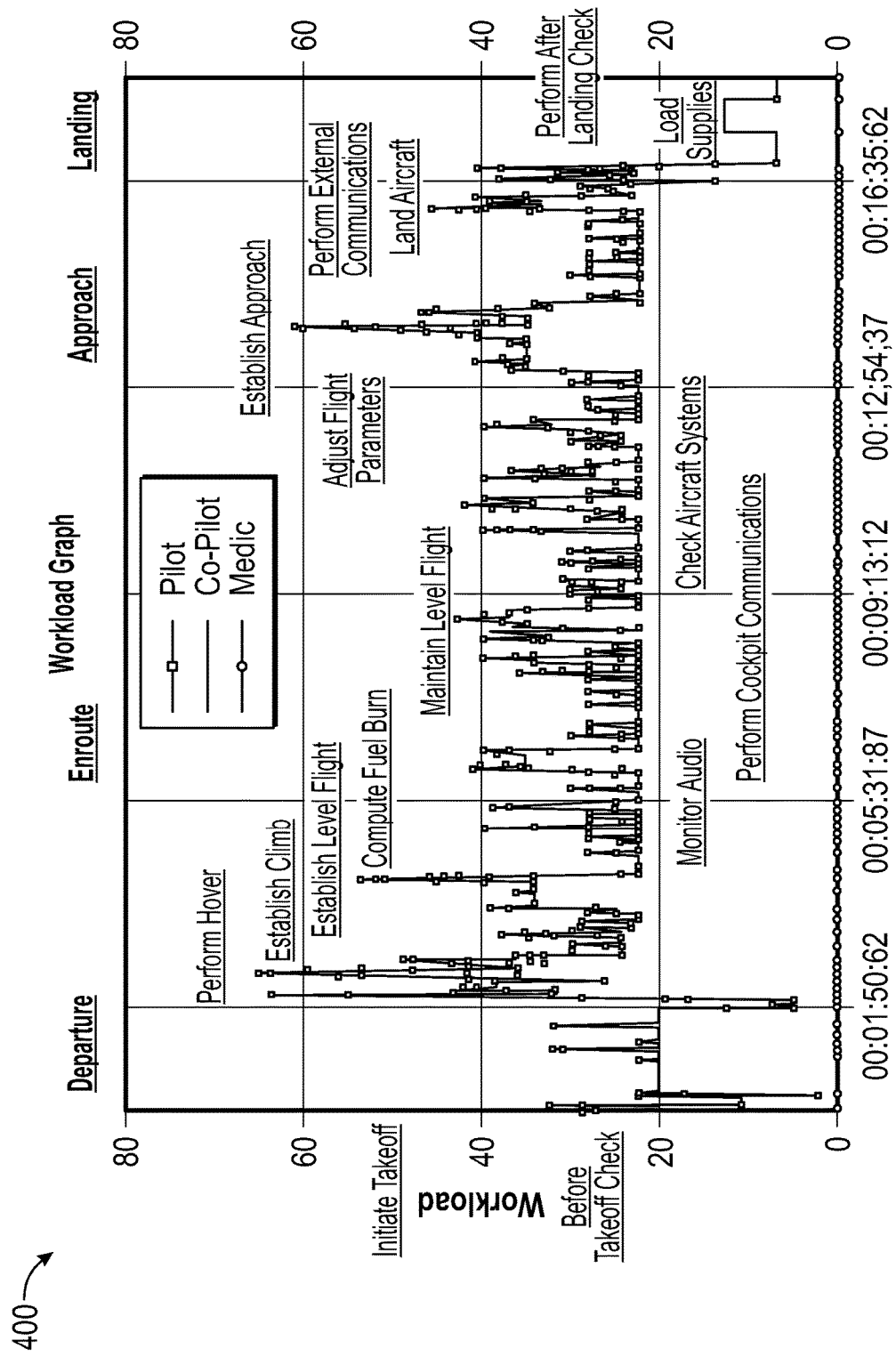
FIG. 4 shows a temporal display of flight operations for an illustrative flight plan with associated changes in workload.

FIG. 4 shows a temporal display 400 of flight operations for an illustrative flight plan. Flight time is shown along the x-axis, while workload is shown along the y-axis. The workload indicates a level of difficulty or a level of concentration required by the flight crew in order to perform the particular operation. Workload tends to vary from operation to operation. Various operations that occur during the flight are labelled at the appropriate temporal location at which they occur. At the beginning of the flight, operations such as "before-takeoff check" and "initiating takeoff" require relatively low levels of concentration from the flight crew. After takeoff, operations such as "hovering," "establishing a climb" and "establishing a level flight" require considerably higher levels of concentration. During flight, various operations such as "computing fuel burn rate," "maintaining level flight" and "adjusting flight parameters" require relatively low levels of concentration. However, the flight crew can also be required to perform in-flight operations that are not directly related to flying the aircraft but are nonetheless related to flight operations. These operations can include, but are not limited to, "monitoring audio communications," "performing cockpit communications" and "checking aircraft system". Landing operations once again involve high levels of concentration from the flight crew. Some landing operations include "establishing an approach," "performing external communications" and "landing the aircraft". After landing, additional operations may be required, including performing after "landing checks" and "loading supplies". These post-landing operations generally will require very little concentration from the flight crew.

Figure 5:
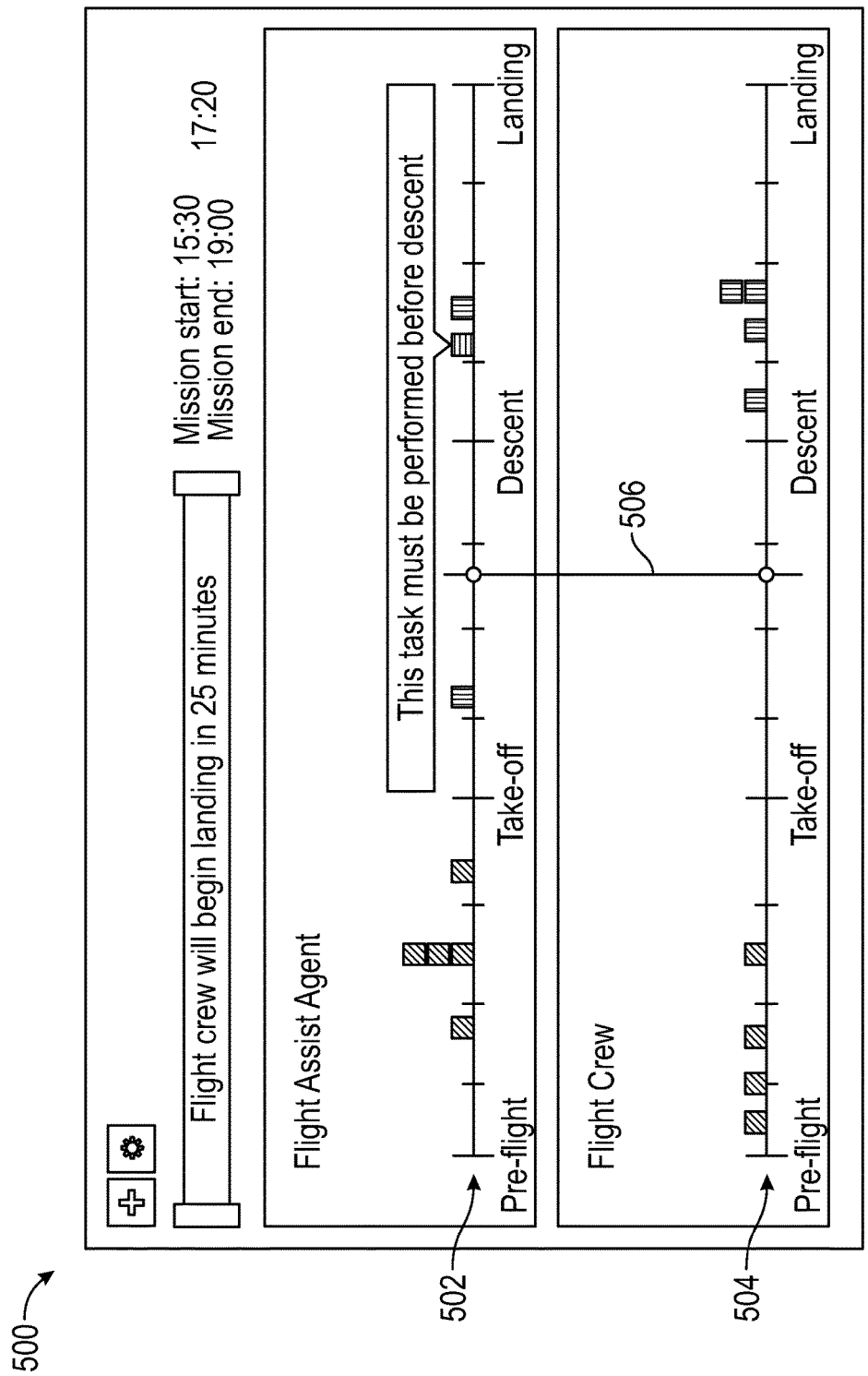
FIG. 5 shows a temporal outline of a flight plan in which tasks for several flight operations have been assigned by a vehicle autonomy management system.

FIG. 5 shows a temporal outline 500 of a flight plan in which tasks for several flight operations have been assigned by the vehicle autonomy management system 206 of FIG. 2. Two timelines are shown alongside each other. The top timeline 502 represents a timeline for the flight-assist agent 208 and the bottom timeline 504 represents a timeline for the flight crew 210. Line 506 indicates a current place of the flight crew 210 and flight-assist agent 208 within the flight plan. Tasks, symbolically represented by boxes, have been allotted to the flight-assist agent 208 and the flight crew 210. It can be seen that the workload at time 510 has been split between the flight crew 210 and the flight-assist agent 208, with most of the tasks being assigned to the flight-assist agent 208 at time 510. The vehicle autonomy management system 206 tracks the performance of the flight crew 210 with respect to executing the tasks assigned to the flight crew and can re-assign or complete one or more tasks that the flight crew 210 is unable to perform to the flight-assist agent 208.

Figure 6:
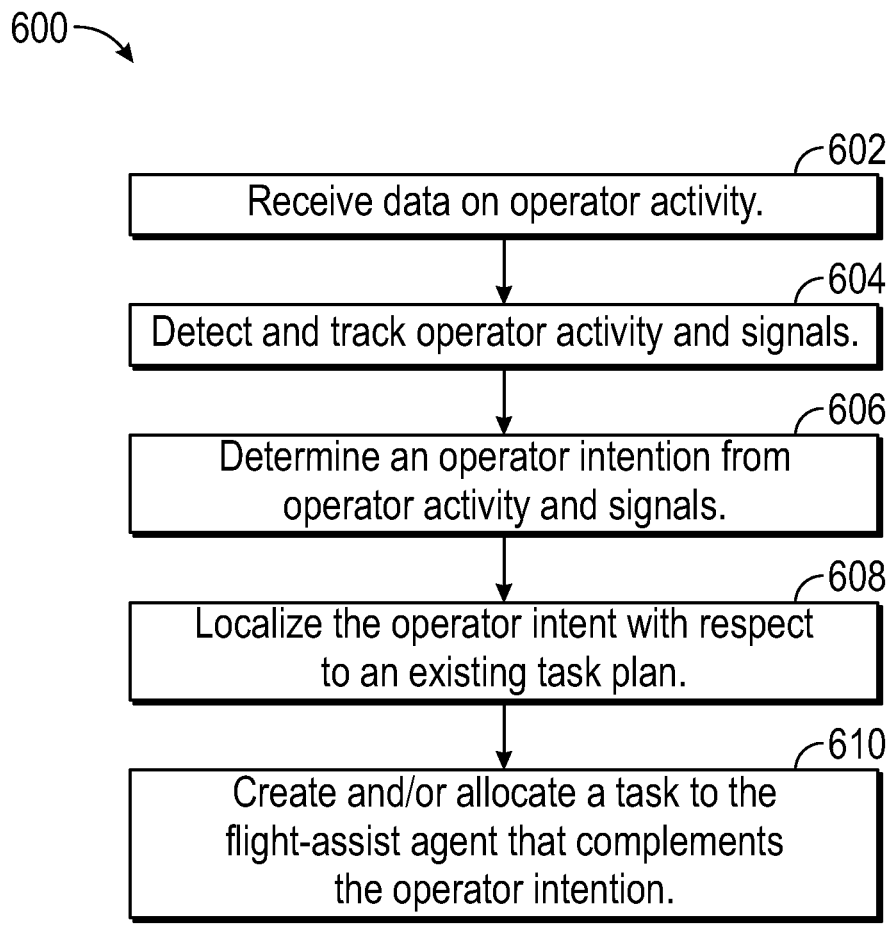
FIG. 6 shows a flowchart of a method or process for determining a performance of the flight crew.

FIG. 6 shows a flowchart 600 of a method or process executed by the vehicle autonomy management system 206 in evaluating a level of performance of the flight crew and/or determining how well the flight crew 210 performs an allotted task. In box 602, the vehicle autonomy management system 206 receives images and/or data from the performance sensors 204 concerning the flight crew's activity. In box 604, the vehicle autonomy management system 206 detects and tracks the flight crew's activity using the data obtained from the performance sensors 204. In box 606, the vehicle autonomy management system 206 determines a flight crew's intentions from the tracked activity by running the activity through an Intent Inference Engine. The Intent Inference Engine runs task workload models on the tracked activity to determine and compare which task(s) the flight crew is performing or executing within the context of the mission goal and available information about current operational conditions. In box 608, the vehicle autonomy management system 206 determines whether the flight crew's intentions are aligned with or compatible with the estimated workload for the required flight plan or the current operation. When the flight crew 210 is performing multiple tasks, the vehicle autonomy management system 206 can determine which tasks the flight crew 210 may be ignoring or neglecting or may be overloaded with. In box 610, the vehicle autonomy management system creates and/or allocates a task to the flight-assist agent 208 that is consistent or compatible with the flight crew's intentions and user-selected autonomy levels. In one embodiment, the vehicle autonomy management system 206 can re-assign or re-allocate a task that the flight crew 210 is currently neglecting or overworked with to the flight-assist agent 208. Additionally, if the vehicle autonomy management system 206 determines that the flight crew 210 is performing the task poorly, often due to outside distractions or being overwhelmed with other tasks, the vehicle autonomy management system 206 can re-assign the current task or other tasks to the flight-assist agent 208. In another embodiment, the vehicle autonomy management system 206 can estimate an flight crew workload for an upcoming task, and decide whether to assign the upcoming task to the flight crew 210 or to the flight-assist agent 208 based on whether the flight crew 210 is able to make required changes or inputs in a timely manner with respect to a current set of tasks, flight crew input delays, flight crew errors and frequency of inputs, etc.

Figure 7:
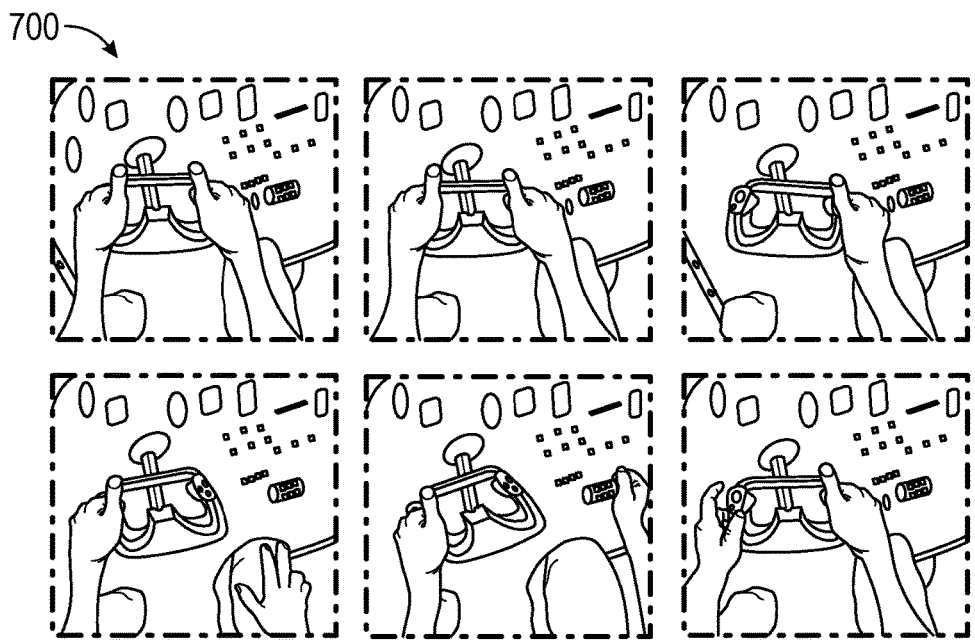
FIG. 7 shows flight crew performance data that can be obtained using various performance sensors.
Figure 8:
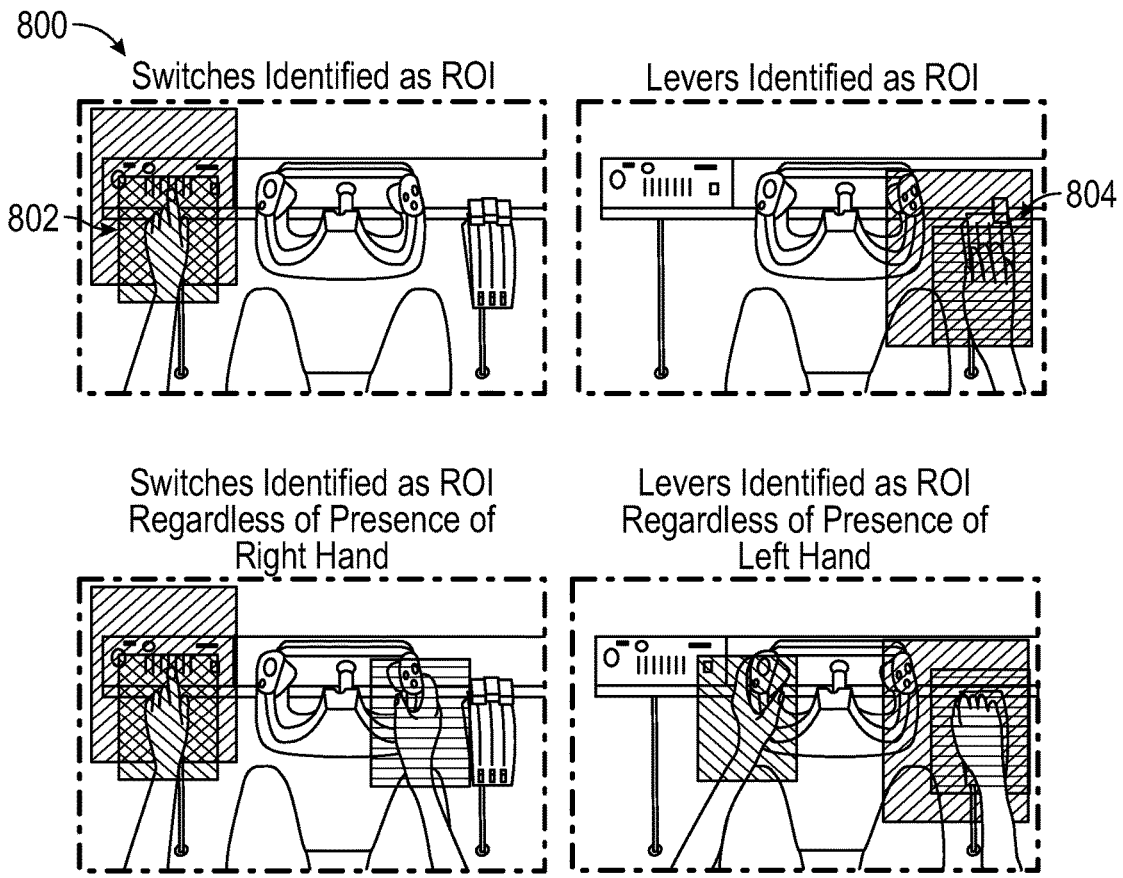
FIG. 8 shows screenshots in which hand movements of a member of the flight crew are tracked by the vehicle autonomy management system.

FIG. 7 shows gesture and performance data 700 that can be obtained using various performance sensors, such as cameras or video monitors, directed at the flight crew or at a member of the flight crew. Hand placements and movements with respect to a flight control module can be observed and tracked. FIG. 8 shows screenshots 800 in which hand movements of the member of the flight crew 210 are tracked by the vehicle autonomy management system 206. Boxes 802 and 804 indicate the locations of the left and right hands, respectively, of the crew member. These locations can be tracked to determine movements by the crew member and thus the flight crew's actions. Pattern recognition software can be used to determine which hand of the crew member is being used and where the hand is being placed with respect to the flight control module. Such a determination can be used to determine the actions being taken by the crew member.

Figure 9:
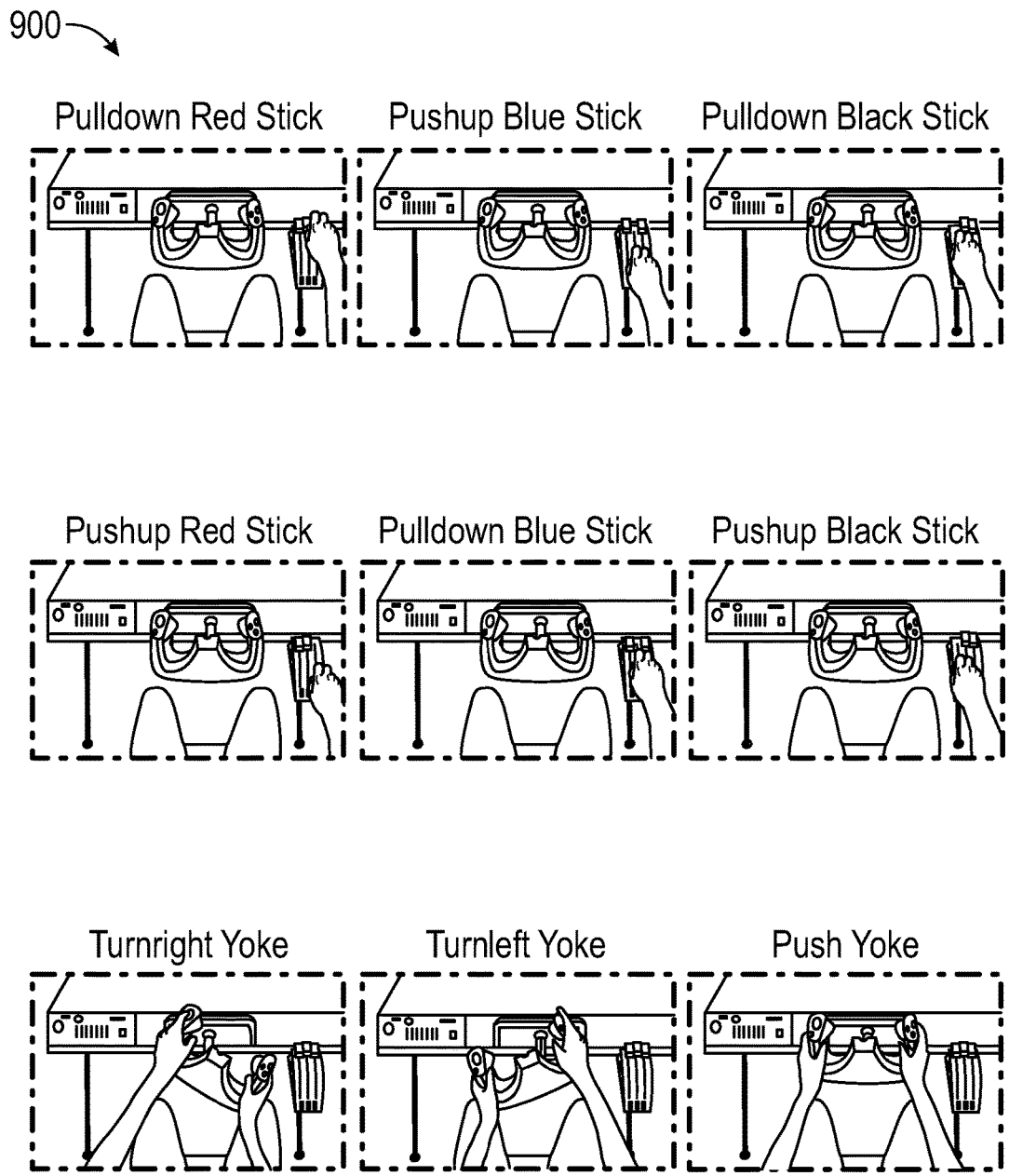
FIG. 9 shows templates of various actions that can be taken by a crew member and corresponding hand positions.

FIG. 9 shows templates 900 of various actions that can be taken by a member of the flight crew 210 and corresponding hand positions. In the top row, from right to left, are "pulldown red stick," "pushup blue stick" and "pulldown black stick." In the middle row, from right to left are "pushup red stick," "pulldown blue stick" and "pushup black stick." In the bottom row, from right to left are "turn right yoke," "turn left yoke" and "push yoke." The hand positions of FIG. 9 can be compared to the various hand positions in FIG. 8 and FIG. 9 to determine the actions taken by the crew member. The comparison can be used to evaluate flight crew's workload performance as well as to make a decision regarding allocation of flight tasks.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit

Having thus described the invention, it is claimed:

1. A method of flying an aircraft, comprising:
receiving data from situational awareness sensors and performance sensors to determine a task workload necessary for completing a flight operation related to flying the aircraft, wherein the situational awareness sensors measure a flight condition of the aircraft and the performance sensors measure data with respect to performance of a flight crew;
allocating the task workload between the flight crew and one or more flight-assist agents;
monitoring a workload and performance of the flight crew in executing a portion of the task workload allocated to the flight crew, wherein monitoring the workload and performance of the flight crew further comprises determining a metric for performing a task allocated to the flight crew and comparing an action of the flight crew to the metric;
adjusting an allocation of the task workload between the flight crew and the one or more flight-assist agents based on the performance of the flight crew and a selected autonomy level; and
determining an intention of the flight crew from the action of the flight crew and creating and allocating a task to the one or more flight-assist agents to complement the intention of the flight crew.

2. The method of claim 1, further comprising monitoring a flight condition of the aircraft and adjusting the allocation of the task workload based on the flight condition.

3. The method of claim 1, wherein the task workload includes a plurality of tasks, further comprising tracking the performance of the flight crew with respect to the plurality of tasks and reallocating a task being neglected by the flight crew to the one or more flight-assist agents.

4. The method of claim 1, further comprising sensing a motion of a member of the flight crew and comparing the motion of the member of the flight crew to a motion that performs the task.

5. The method of claim 4, further comprising monitoring a signal generated by input from the member of the flight crew and using the motion of the member of the flight crew and the signal generated by the flight crew input to evaluate the performance of the member of the flight crew.

6. The method of claim 1, further comprising making the flight crew aware of a task and completing the task when the flight crew is unable to perform the task.

7. A system for flying an aircraft, comprising:
one or more flight-assist agents for performing an operation related to flying the aircraft;
a vehicle autonomy management system configured to:
receive data from situational awareness sensors and performance sensors to determine a task workload necessary for performing the operation related to flying the aircraft, wherein the situational awareness sensors measure a flight condition of the aircraft and the performance sensors measure data with respect to performance of a flight crew;
allocate tasks of a task workload involved in the operation between a flight crew and the one or more flight-assist agents,
monitor a performance of the flight crew in executing a portion of the task workload allocated to the flight crew, wherein the vehicle autonomy management system monitors the performance of the flight crew by determining a metric for performing a task allocated to the flight crew and comparing an action of the flight crew to the metric,
adjust an allocation of the task workload between the flight crew and the one or more flight-assist agents based on the performance of the flight crew; and
determine an intention of the flight crew from the action of the flight crew and allocate a task that complements the intention of the flight crew.

8. The system of claim 7, wherein the vehicle autonomy management system decomposes a mission into tasks and allocates the tasks between the flight crew and the one or more flight-assist agents based on a selected level of autonomy.

9. The system of claim 7, wherein the vehicle autonomy management system makes the flight crew aware of a task and allocates the task to the one or more flight-assist agents when the flight crew is unable to perform or complete the task.

10. The system of claim 7, wherein the vehicle autonomy management system further monitors a flight condition of the aircraft and adjusts the allocation of the task workload based on the flight condition.

11. The system of claim 7, wherein the vehicle autonomy management system compares the action of a member of the flight crew to the metric by performing at least one of: (i) comparing a motion of the member of the flight crew to a motion that performs the task; and (ii) comparing a signal generated by input by the member of the flight crew to an expected signal for performing the task.

* * * * *